US011010654B2

(12) United States Patent
Uijlenbroek et al.

(10) Patent No.: US 11,010,654 B2
(45) Date of Patent: *May 18, 2021

(54) RFID MESH LABEL, TIRE HAVING RFID MESH LABEL INTEGRALLY INCORPORATED THEREIN, AND METHODS OF MAKING

(71) Applicant: FineLine Technologies, Norcross, GA (US)

(72) Inventors: Jos Uijlenbroek, Ophemert (NL); Michael E. Borgna, O'Fallon, MO (US)

(73) Assignee: FINELINE TECHNOLOGIES, INC., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,906

(22) Filed: Mar. 9, 2020

(65) Prior Publication Data

US 2020/0210802 A1 Jul. 2, 2020

Related U.S. Application Data

(63) Continuation of application No. 16/284,068, filed on Feb. 25, 2019, now Pat. No. 10,621,485.

(Continued)

(51) Int. Cl.
*G06K 19/077* (2006.01)
*B29D 30/06* (2006.01)
(Continued)

(52) U.S. Cl.
CPC ... *G06K 19/07764* (2013.01); *B29D 30/0633* (2013.01); *B60C 19/00* (2013.01);
(Continued)

(58) Field of Classification Search
None
See application file for complete search history.

(56) References Cited

U.S. PATENT DOCUMENTS 7,108,761 B2 9/2006 Bell
7,598,877 B2 10/2009 Lionetti
(Continued)

FOREIGN PATENT DOCUMENTS

EP 1713021 A1 10/2006
EP 3533640 A1 9/2019
GB 559986 A 8/1944

OTHER PUBLICATIONS

Extended European Search Report (EESR) for EP Pat. App. No. 19159822.6 dated Jul. 25, 2019 (5 pages).

*Primary Examiner* — Chico A Foxx
(74) *Attorney, Agent, or Firm* — Shumaker, Loop & Kendrick, LLP

(57) ABSTRACT

An RFID mesh label configured to be integrally incorporated within a vulcanized tire and to further provide unique identifier(s) and/or other information about the vulcanized tire during and/or post-vulcanization, the RFID mesh label including a face layer configured to be positioned adjacent or flush to an outer surface of the vulcanized tire; an RFID layer positioned underneath the face layer, the RFID layer having an RFID device that is configured to provide unique identifier(s) and/or other information about the vulcanized tire upon being read with an RFID reader; and a mesh backing overlying the RFID layer and adapted to be integrally incorporated in a vulcanized tire after subjecting a green tire to a vulcanization process.

39 Claims, 13 Drawing Sheets

Related U.S. Application Data

(60) Provisional application No. 62/636,450, filed on Feb. 28, 2018.

(51) Int. Cl.
    *G06K 19/02*     (2006.01)
    *B60C 19/00*     (2006.01)
    *B29D 30/00*     (2006.01)

(52) U.S. Cl.
    CPC .... *G06K 19/025* (2013.01); *B29D 2030/0072* (2013.01); *B29D 2030/0077* (2013.01)

(56) References Cited

U.S. PATENT DOCUMENTS

| | | | |
|---|---|---|---|
| 8,063,741 B2 * | 11/2011 | Hioki | B31D 1/027 |
| | | | 340/10.1 |
| 8,142,600 B2 | 3/2012 | Kleckner | |
| 8,157,172 B2 | 4/2012 | Fenkanyn | |
| 8,485,359 B2 * | 7/2013 | Anderson | B65D 51/30 |
| | | | 206/459.1 |
| 8,869,854 B2 | 10/2014 | Landers et al. | |
| 10,137,741 B2 | 11/2018 | Ferry et al. | |
| 10,457,005 B2 | 10/2019 | Keenan et al. | |
| 2005/0059308 A1 | 3/2005 | Parsons | |
| 2005/0221704 A1 | 10/2005 | Conwell et al. | |
| 2006/0290505 A1 | 12/2006 | Conwell et al. | |
| 2007/0158436 A1 | 7/2007 | Ichikawa et al. | |
| 2010/0032066 A1 | 2/2010 | Nakao et al. | |
| 2010/0212811 A1 | 8/2010 | Seitz | |
| 2013/0126063 A1 | 5/2013 | Landers et al. | |
| 2013/0160913 A1 * | 6/2013 | Lonkar | B29D 30/0606 |
| | | | 152/523 |
| 2015/0202837 A1 | 7/2015 | Coetzee | |
| 2017/0001480 A1 | 1/2017 | Ferry et al. | |
| 2017/0277992 A1 | 9/2017 | Janko et al. | |
| 2017/0344864 A1 * | 11/2017 | Forster | G06K 19/07786 |
| 2019/0266465 A1 | 8/2019 | Uijlenbroek et al. | |

* cited by examiner

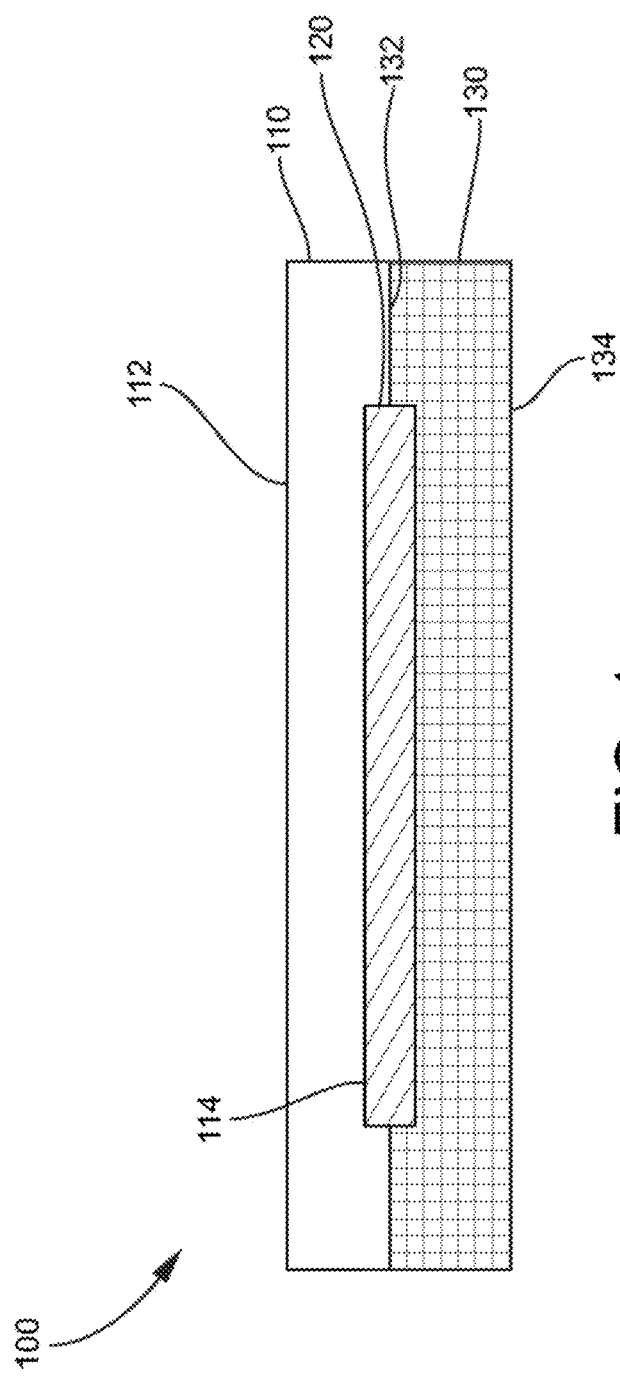

RFID MESH LABEL, TIRE HAVING RFID MESH LABEL INTEGRALLY INCORPORATED THEREIN, AND METHODS OF MAKING

TECHNICAL FIELD

The present invention relates generally to mesh labels having barcode and/or radio frequency identification (RFID) capabilities, and more particularly, to RFID mesh labels that can be applied on rubber-based articles (e.g., green tires) prior to vulcanization processes and can maintain operability during these processes as well as subsequent use of an article. Additionally, the present subject matter is directed to methods of producing articles and methods of using such labels and articles.

BACKGROUND

Articles are commonly monitored during manufacture and thereafter for inventory control purposes. A common practice in many fields is to apply a label to an article containing an identifier or other information associated with the article.

Regarding tire manufacture, to which the present invention finds particular application, identifying tires and other rubber-based articles can be problematic, particularly if the identification is to occur prior to fabrication and/or before production is complete. Tires and a wide array of other rubber-based articles can be subjected to one or more vulcanization processes in which the tire or tire components are fused or molded together. Vulcanization modifies the rubber-based composition by forming an extensive network of crosslinks within the rubber matrix, thereby significantly increasing the strength and durability of the article. Although numerous vulcanization techniques are known having various different curing systems, all or nearly all vulcanization techniques include the application of high pressure and elevated temperatures to the "green," i.e., non-vulcanized, rubber-based article.

In view of these process conditions, adhesive-based labels have been developed that can be applied to green rubber-based articles such as tires, and which can endure the relatively high temperatures and pressures associated with vulcanization. While satisfactory in many respects, adhesive labels and adhesive bead labels are not designed to last the lifetime of the article and can become detached from the article due to the various types of stress the article is subjected to both during and after production.

Potential detachment of the label can be caused by label stiffness and the inability to handle the flexing of rubber during multiple stages of the tire build and when fitted on the rim. The problem starts initially during the vulcanization process while the mold is moving, and continues right after curing when the tire is still hot. If the tire is released from the mold and moves (e.g., flexes) too much, the label can fall off or at the least the adhesion is weakened as a result of the movement. Additionally, during the process of fitting the tire on a rim, the tire (particularly the bead area) is subjected to significant mechanical stress by the fitting machines. Lastly, when tires are in use, the various road and driving stresses can cause the bead label to detach from the tire.

Within the tire industry, label suppliers are concentrating on the development of better adhesives. Conversely, tire and rubber product producers are experimenting on the positioning of the label by applying the label in the so-called "non-flexing-zones" of the tire or rubber product. While these activities could potentially alleviate detachment to some degree, they are not final solutions. Additionally, the addition of RFID chips to current solutions contributes to detachment, and locating current labels behind the metal rim post-fitting impedes the ability to read the RFID chip from a useful distance.

Accordingly, what is needed is an alternative to an adhesive-based RFID label capable of remaining attached and operable to a rubber-based article during article production (e.g., vulcanization), distribution, inventory and article lifetime.

SUMMARY

Disclosed are RFID mesh labels that provide solutions to currently observed industry problems. Specifically, the RFID mesh labels disclosed herein are capable of remaining attached and operable to a rubber-based article (e.g., tires) by creating non-flex zones during and/or post-article production (e.g., vulcanization), distribution, inventory, and article lifetime thereby providing unique identifier(s) and/or other information about the article during distribution, inventory, and article lifetime. In certain aspects disclosed is an RFID mesh label configured to be integrally incorporated within a vulcanized tire that provides unique identifier(s) and/or other information about the vulcanized tire during tire manufacture and throughout the lifetime of the vulcanized tire. The RFID mesh label includes a face layer configured to be positioned adjacent to or flush on an outer surface of the vulcanized tire (post-vulcanization); an RFID layer positioned underneath the face layer, the RFID layer having an RFID device that is configured to sense and/or provide unique identifier(s) and/or other information about the vulcanized tire upon being read with an RFID reader; and a mesh backing overlying the RFID layer that is adapted to be integrally incorporated in a vulcanized tire after subjecting a green tire to a vulcanization process.

In certain aspects, the mesh backing includes a surface treatment that facilitates bonding between a green tire and the mesh backing during vulcanization to result in the RFID mesh label being integrally incorporated within a vulcanized tire (post-vulcanization).

In certain aspects, the surface treatment comprises a coating having reactive thiols therein, a coating having reactive amines therein, a coating having reactive hydroxyls therein, or any combination thereof that facilitate crosslinking between the mesh backing and a green tire during vulcanization to integrally incorporate the mesh backing within the vulcanized tire formed by the vulcanization process.

In certain aspects, the face layer and mesh backing have convergent ends bonded together along the periphery of the RFID mesh label such that the face layer and mesh backing surround the RFID layer and encase the RFID layer within the RFID mesh label.

In certain aspects, the convergent ends of the face layer and mesh backing are configured to release from one another during vulcanization of the article/tire.

In certain aspects, the mesh backing is a grid having a predetermined shape with a plurality of openings formed thereon that are configured to pass material from the green article/tire there through in a direction towards the RFID device and/or face layer of the RFID mesh label. For example, the grid, in certain aspects, is an orthogonal grid shape. In certain aspects, the grid is deformable or non-deformable—with the grid either deforming (e.g., resulting in distorted grid) during vulcanization or being non-deformable and maintaining its initial shape during and after vulcanization of the tire. In certain aspects, the mesh backing is an orthogonal grid configured to pass and disperse green rubber material from a green tire through the orthogonal grid during vulcanization to the RFID layer and/or face layer such that portions of the RFID layer and/or face layer are bonded to the vulcanized tire.

In certain aspects, the mesh backing is a non-deformable orthogonal grid configured to homogeneously pass and disperse green rubber material from a green tire through the non-deformable orthogonal grid during vulcanization to the RFID layer and/or face layer such that portions of the RFID layer and/or face layer are bonded (homogeneously bonded) to the vulcanized tire.

In certain aspects, the mesh backing is more rigid than both the RFID and face layer(s) and is configured to limit mechanical stress to the RFID and/or face layers while the RFID mesh label is in use by absorbing and/or dampening mechanical stress transmitted from the vulcanized tire to the RFID mesh label.

In additional aspects, also disclosed are methods for forming vulcanized tire(s) having an RFID mesh label integrally incorporated therein, the method includes: (a) attaching an RFID mesh label on an outer surface of a green tire; (b) placing the green tire with the RFID mesh label attached thereon into a tire mold; (c) subjecting the green tire of step (b) to vulcanization conditions; (d) while vulcanizing the green tire of step (c), passing green rubber material from the green tire through a mesh backing of the RFID mesh label in a direction towards a face layer of the RFID mesh label while concurrently migrating the RFID mesh label in an internal direction of the green tire; and (e) concluding vulcanization thereby forming a vulcanized tire having the mesh backing of the RFID mesh label internally positioned within the vulcanized tire such that: (i) the mesh backing and other portions of the RFID mesh label are permanently bonded to internal portions of the vulcanized tire, and (ii) the face layer is adjacent to or flush with an outer surface of the vulcanized tire such that an RFID device within the RFID mesh label can be read from a predetermined distance by a RFID reader.

In certain aspects of the method, the RFID mesh label comprises the face layer and mesh backing with the RFID device positioned there between.

In certain aspects of the method, the mesh backing is a grid having a predetermined shape. For example, the grid, in certain aspects, is an orthogonal grid shape. In certain aspects, the grid is deformable or non-deformable—with the grid either deforming (e.g., resulting in distorted grid) during vulcanization or being non-deformable and maintaining its initial shape during and after vulcanization of the tire.

In certain aspects of the method, the mesh backing maintains an orthogonal grid shape throughout vulcanization and after step (e) of forming the vulcanized tire.

In certain aspects of the method, the green rubber material homogeneously disperses through the orthogonal grid during step (d).

In certain aspects of the method, the vulcanized tire of step (e) includes undulating ridges formed on and visible from an outer surface of the vulcanized tire, the undulating ridges correspond to the mesh backing permanently bonded within the vulcanized tire.

In certain aspects of the method, the face layer further comprises bar coding formed thereon.

In certain aspects of the method, the RFID mesh label is integrally incorporated on a tire sidewall or a tire bead.

In yet further aspects, also disclosed is a vulcanized tire including an RFID mesh label integrally incorporated within the vulcanized tire that is configured to provide unique identifier(s) and/or other information about the tire, wherein the RFID mesh label comprises: a face layer configured to be adjacent or flush to an outer surface of the vulcanized tire, the outer surface of the vulcanized tire is a tire sidewall or a tire bead; an RFID layer positioned underneath the face layer, the RFID layer having an RFID device that provides unique identifier(s) and/or other information upon being read with an RFID reader; and a mesh backing overlying the RFID layer that is a non-deformable orthogonal grid having vulcanized rubber material homogeneously passed and dispersed there through such that the mesh backing is surrounded by and bonded to vulcanized rubber material of the vulcanized tire and portions of the RFID layer and face layer of the RFID mesh label are bonded to vulcanized rubber material of the vulcanized tire.

In certain aspects of the vulcanized tire, the RFID mesh label further comprises bar coding formed on an outermost surface of the face layer.

In certain aspects of the vulcanized tire, undulating ridges are formed on an outer surface of the vulcanized tire that correspond to the internal position of the mesh backing positioned within the vulcanized tire and the undulating ridges are laterally adjacent to planar surfaces formed on the outer surface of the vulcanized tire.

In one aspect, the inventive concepts disclosed herein are directed to RFID mesh label(s) including a chemically-treated mesh material/backing (e.g., having reactive amine groups, hydroxyl groups, and/or thiol groups) available within the rubber industry. After applying such a label on a non-vulcanized article such as a tire, during vulcanization the mesh backing/material releases from the bead label material as a result of the high temperature and/or pressure, the rubber "floats"/passes through the mesh backing/material and crosslinks the RFID mesh label to the rubber, and the mesh backing/material creates a stiff non-flexing zone within the rubber article where the label is integrated with the rubber material of the article just under the label surface. As a result, the RFID mesh label remains on the rubber article and is inseparable and operable therefrom for the lifetime of the article.

This present solution utilizes a combination of different types of materials known and in use separately in the tire and rubber industry. The mesh backing/mesh material is currently in use in various tires produced to enforce/re-inforce the tire construction. For example, the mesh backing/mesh material disclosed herein preferably comprises nylon, and current suppliers of nylon mesh backings/materials include, but are not limited to, Milliken & Company™ and Glanzstoff™. Current suppliers of vulcanizing label materials include, but are not limited to, Data2™, Lintec™, Avery Dennison™ and Computype™.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 1 is a schematic depiction of the RFID mesh labels disclosed herein;

DETAILED DESCRIPTION

Figure 2A:
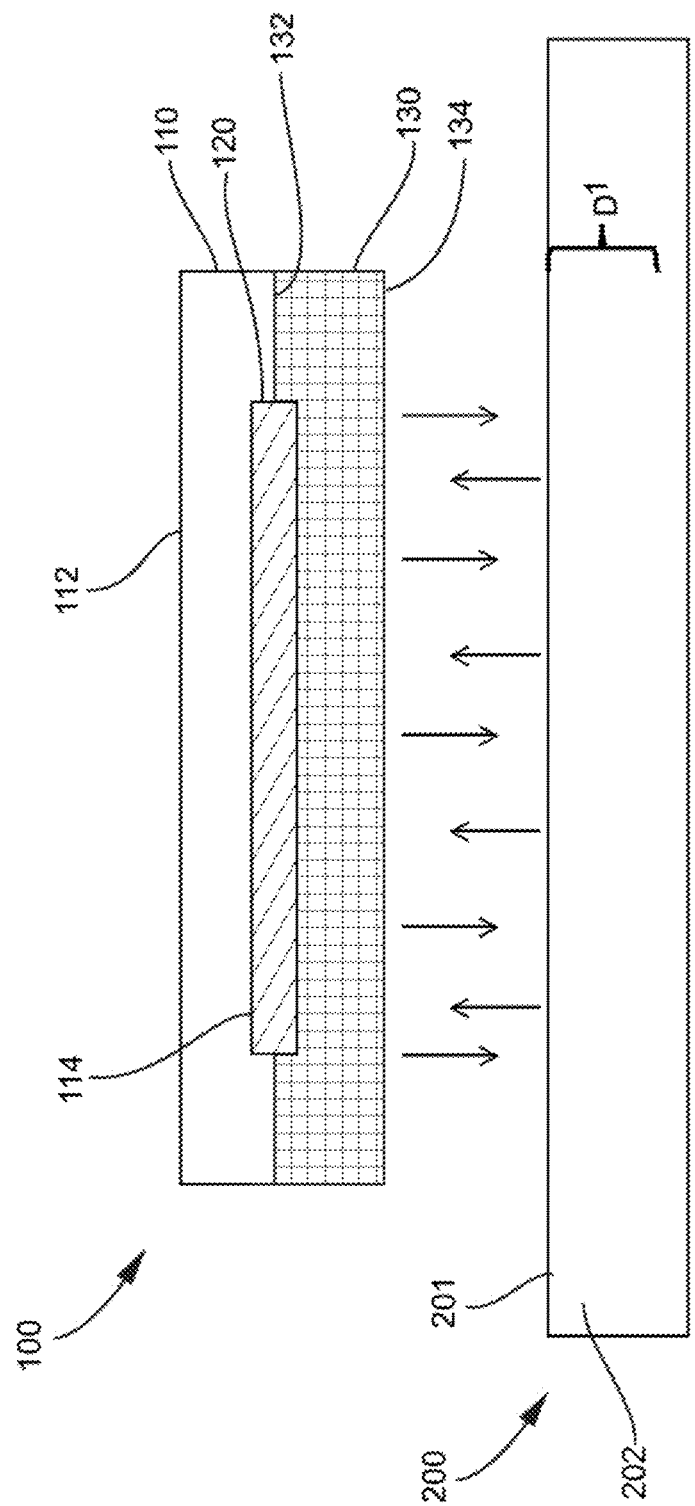
FIGS. 2A, 2B, 2C, and 2D sequentially depict the RFID mesh label being provided/attached to a green tire and migrating/descending towards an internal depth ($D^1$) within the tire during vulcanization such that the mesh label is integrally formed with the vulcanized tire.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

RFID mesh labels according to the present invention enable various tire tracking solutions that include electronic identification provisions such as, for example, RFID devices incorporated in/onto a substrate such as a mesh backing/material such that the labels are configured to withstand pressures, temperatures and stresses associated with manufacturing (e.g., tire vulcanization) and a wide variety of use of tires and other rubber products while concurrently maintaining operability during these processes, after these processes, and throughout the lifetime of the article thereby sensing and providing unique identifier(s) and/or other information about the article during distribution, inventory, and article lifetime.

As disclosed further below, the RFID mesh label can be affixed to and/or incorporated on the sidewall and/or within the bead of a wide array of tires. Depending on the type of tire, the stretch of the tire (sidewall) or the use of the tire (e.g. racing tires), the thickness and surface area of the different label materials including the mesh backing/substrate may vary.

As will be appreciated, tires are typically used in combination with rims of a vehicle. The rubber-based tire provides support and gripping for the vehicle with a road or ground surface. The RFID mesh label may be used with bias tires, belted bias tires, radial tires, solid tires, semi-pneumatic tires, pneumatic tires, airless tires, truck and bus tires, airplane tires, agro tires, racing tires, etc.

In certain embodiments the label can withstand conditions typically associated with vulcanization processes without degradation. The term vulcanization as used herein generally refers to heating to a temperature greater than 90° C., and up to 200° C., for a predetermined time period, for example, at least 10 minutes up to several hours.

The RFID mesh label generally includes at least one RFID device. The at least one RFID device generally includes an antenna for wirelessly transmitting and/or receiving RF signals and analog and/or digital electronics operatively connected thereto. The RFID device can include passive RFID devices, or active or semi-passive RFID devices including a battery or other power source. The electronics can be implemented via an integrated circuit (IC) or microchip or other suitable electronic circuit and may include, for example, communications electronics, data memory, control logic, etc.

The RFID device can operate in a variety of frequency ranges including, but not limited to, a low frequency (LF) range (i.e., from approximately 30 kHz to approximately 300 kHz), a high frequency (HF) and NFC (Near Field Communication) range (i.e., from approximately 3 MHz to approximately 30 MHz) and an ultra-high frequency (UHF) range (i.e., from approximately 300 MHz to approximately 3 GHz). A passive device can operate in any one of the aforementioned frequency ranges, in particular, for passive devices, LF systems can operate at about 124 kHz, 125 kHz or 135 kHz, HF and NFC systems can operate at about 13.56 MHz, and UHF systems can use a band from 860 MHz to 960 MHz. Alternately, passive device systems can use 2.45 GHz and other areas of the radio spectrum. Active RFID devices can operate at about 455 MHz, 2.45 GHz, or 5.8 GHz. Semi-passive devices can operate at a frequency of about 2.4 GHz.

The read range of the RFID device (i.e., the range at which the RFID reader can communicate with the RFID device) can be determined by the type of device (i.e., active, passive, etc.). Passive LF RFID devices (also referred to as LFID or LowFID devices) can typically be read from within approximately 12 inches (0.33 meters); passive HF RFID devices (also referred to as HFID or HighFID or NFC devices) can typically be read from up to approximately 3 feet (1 meter); and passive UHF RFID devices (also referred to as UHFID devices) can typically be read from approximately 10 feet (3.05 meters) or more. One factor influencing the read range for passive RFID devices is the method used to transmit data from the device to the reader, i.e., the coupling mode between the device and the reader-which can be either inductive coupling or radiative/propagation coupling. Passive LFID devices and passive HFTD devices can use inductive coupling between the device and the reader, whereas passive UHFID devices can use radiative or propagation coupling between the device and the reader.

Alternatively, in radiative or propagation coupling applications (e.g., as are conventionally used by passive UHFID devices), rather than forming an electromagnetic field between the respective antennas of the reader and device, the reader can emit electromagnetic energy that illuminates the device. In turn, the device gathers the energy from the reader via an antenna, and the device's IC or microchip uses the gathered energy to change the load on the device antenna and reflect back an altered signal, i.e., backscatter. UHFID devices can communicate data in a variety of different ways, e.g., increase the amplitude of the reflected wave sent back to the reader (i.e., amplitude shift keying), shift the reflected wave out of the phase received wave (i.e., phase shift keying), or change the frequency of the reflected wave (i.e., frequency shift keying). The reader in turn picks up the backscattered signal and converts the altered wave into data understood by the reader or adjunct computer.

The antenna employed in the RFID device can be affected by numerous factors, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices can be provisioned with a coil antenna having many turns in order to produce enough voltage to operate the device IC or microchip. Comparatively, a conventional HFID passive device can be provisioned with an antenna which is a planar spiral (e.g., with 5 to 7 turns over a credit-card-sized form factor), to provide read ranges on the order of tens of centimeters. HFID antenna coils can be less costly to produce (e.g., compared to LFID antenna coils), since they can be made using techniques relatively less expensive than wire winding, e.g., lithography or the like. UHFID passive devices can be radiatively and/or propagationally coupled with the reader antenna and consequently can employ conventional dipole like antennas.

The RFID mesh label of the present invention can utilize any of the aforementioned RFID devices, as well as others not specifically mentioned, in one embodiment, the RFID device is a passive device.

Figure 8B:
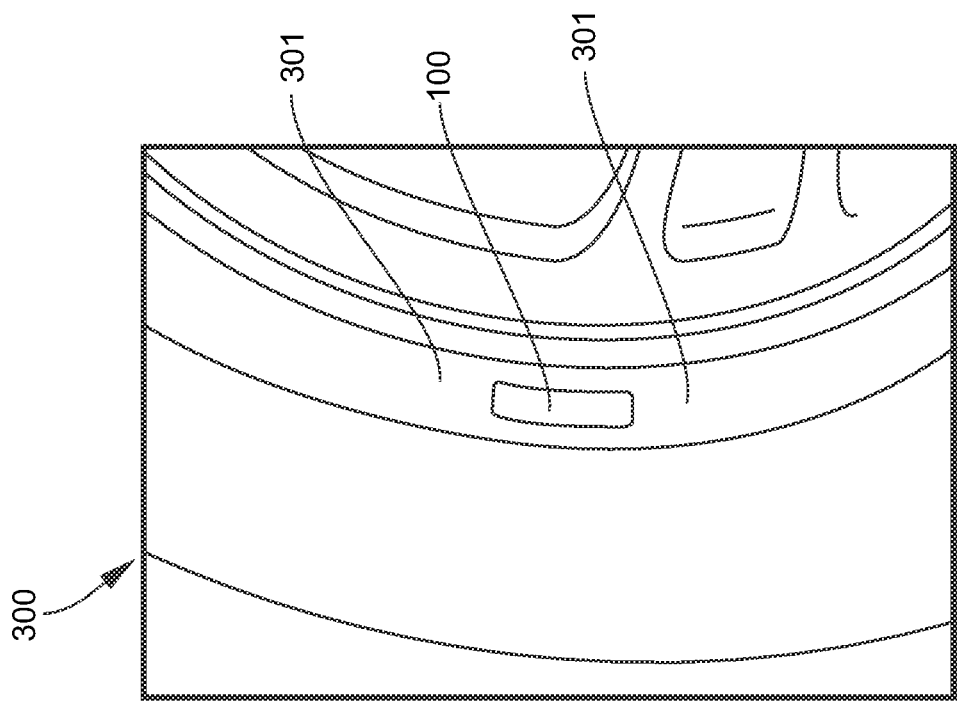
FIG. 8B is a photograph of another RFID mesh label integrally formed on a vulcanized tire having a bar code printed on the face layer.
Figure 8A:
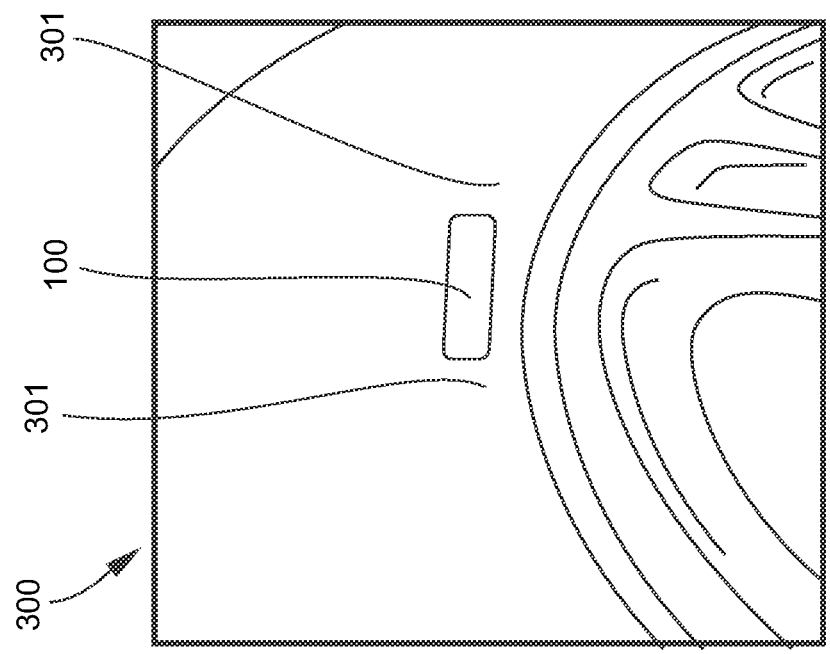
FIG. 8A is a photograph of an RFID mesh label integrally formed on a vulcanized tire having a plain face layer.
Figure 8C:
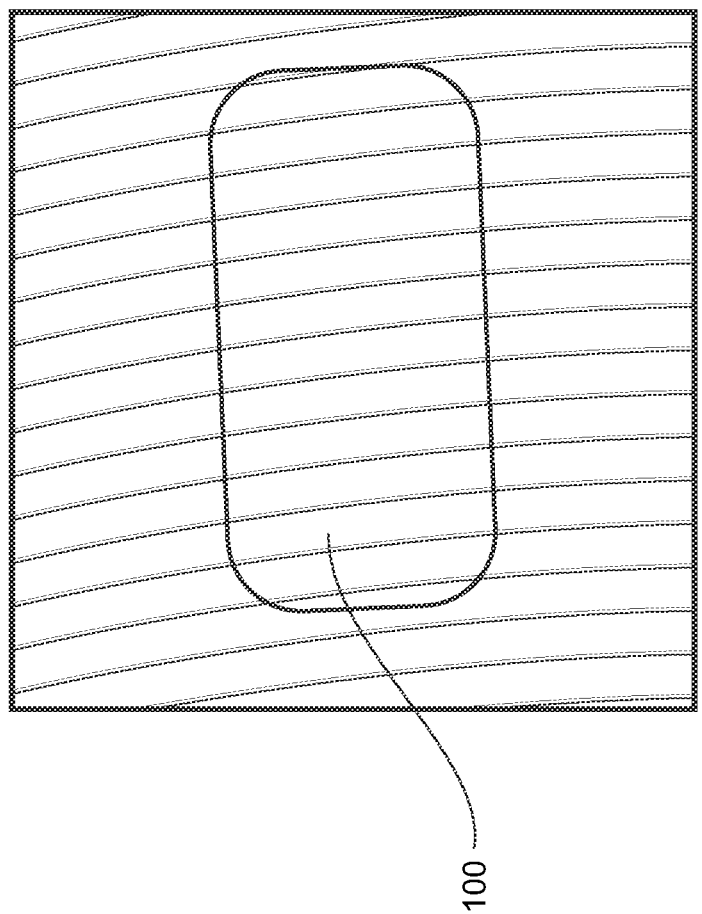
FIG. 8C is a photograph showing an RFID mesh label integrally incorporated into a vulcanized tire along with undulating ridges formed on an outer surface of the vulcanized tire that correspond to the internal position of the mesh backing positioned within the vulcanized tire.

Now with specific reference to the Figures included herein, the RFID mesh labels 100 will be further described below in detail. FIG. 1 specifically schematically depicts the RFID mesh label 100 disclosed herein, which as further shown in FIGS. 8A-8C, are configured to be integrally incorporated within a vulcanized tire 300 and to provide unique identifier(s) and/or other information about the vulcanized tire. As further shown in FIG. 1, the RFID mesh label 100 includes a face layer 110 configured to be positioned adjacent or flush to an outer surface of the vulcanized tire; an RFID layer 120 positioned underneath the face layer, the RFID layer having an RFID device that is configured to provide unique identifier(s) and/or other information about the vulcanized tire upon being read with an RFID reader; and a mesh backing 130 overlying the RFID layer and adapted to be integrally incorporated in a vulcanized tire after subjecting a green tire to a vulcanization process.

The face layer 110 of the RFID mesh label 100 is preferably formed from a rigid planar material (e.g., a polyester or a polyester film) that overlies and protects the RFID layer 120 (and more particularly the RFID device) during and after incorporation of the RFID mesh label 100 into a green tire 200 that is subsequently vulcanized such that operability of RFID device is maintained during and post-vulcanization. The face layer 110 includes an outermost surface 112 opposite the RFID layer 120 and the mesh backing 130; the outermost surface 112 is visible post-installation of the RFID mesh label (and post-vulcanization of the tire). The face layer 110, and more particularly the outermost surface 112, may have other unique identifiers such as color and/or bar coding (2D or 3D bar coding) provided and/or printed thereon. The face layer 110 further includes an inner surface 114 that is immediately adjacent the RFID layer 120 and may further include an adhesive that adheres the face layer 110 to the RFID layer 120. In certain aspects, the face layer 110 is preferably a solid material with no voids, openings, and/or spaces formed on the outermost surface 112 and is non-deformable, substantially non-deformable, or is resiliently deformable both during and post-vulcanization of the rubber article (i.e., green tire to vulcanized tire) thereby further protecting the RFID layer 120 (and RFID device) positioned underneath the face layer.

As further shown in FIGS. 1 and 2A, the mesh backing 130 further overlies the RFID layer 120 on a side of the RFID mesh label 100 opposite the face layer 110. Similar to the face layer 110, the mesh backing/layer 130 is formed of a rigid planar material (e.g., nylon) having an inner surface 132 and an outermost surface 134, and in certain aspects, the mesh backing substantially corresponds in shape to the face layer 110 while in other aspects the mesh backing/layer is larger and extends beyond the outer peripheral edges of both the RFID layer 120 and the face layer 110. As also shown in FIGS. 1 and 2A further in view of FIG. 2B, it should be further noted that the inner surface 132 of the mesh backing 130 is configured to releasably adhere to portions of the face layer 110. Specifically as shown in FIGS. 1 and 2A and as further discussed below, the face layer 110 and mesh backing 130 have convergent ends bonded (releasably bonded) together along the periphery of the RFID mesh label 100 such that the face layer 110 and mesh backing 130 surround the RFID layer 120 and encase the RFID layer within the RFID mesh label. As discussed further below, the convergent ends of the face layer 110 and mesh backing 130 are configured to release from one another during vulcanization to further facilitate integral incorporation of the RFID mesh label 100 into the tire undergoing vulcanization.

In further view of FIGS. 1 and 2A, the outermost surface 134 of the mesh backing 130 is configured to attach to an outermost surface 201 (also referred to as outer surface) of a green tire 200 and to subsequently integrally bond with the tire during vulcanization (i.e., while forming the vulcanized tire). To further facilitate bonding between the mesh backing 130 and the tire during vulcanization, at least the outermost surface 134 of the mesh backing 130 further includes a surface treatment. In certain aspects, this surface treatment includes a coating having reactive thiols therein, a coating having reactive amines therein, a coating having reactive hydroxyls therein, or any combination thereof that facilitate covalent bonding and/or crosslinking between the mesh backing/material 130 and a green tire 200 during vulcanization to integrally incorporate the mesh backing within the subsequently formed vulcanized tire. Also in view of the above, the mesh backing 130 is more rigid than both the RFID and face layer(s) and is configured to further limit mechanical stress to the RFID layer 120 and/or face layer 110 while the RFID mesh label 100 is in use by creating non-flexing zones that absorb, distribute, and/or dampen mechanical stress transmitted from the vulcanized tire to the RFID mesh label.

Figure 6B:
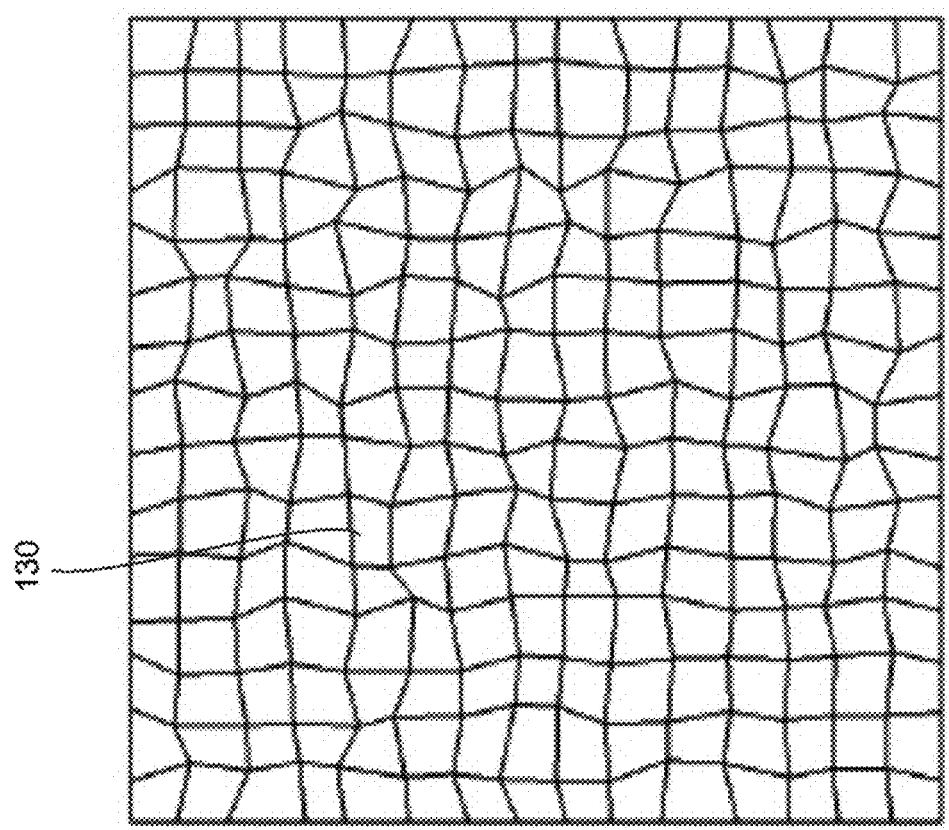
FIGS. 6A and 6B schematically depict the mesh backing having an orthogonal grid and distorted grid respectively.
Figure 6A:
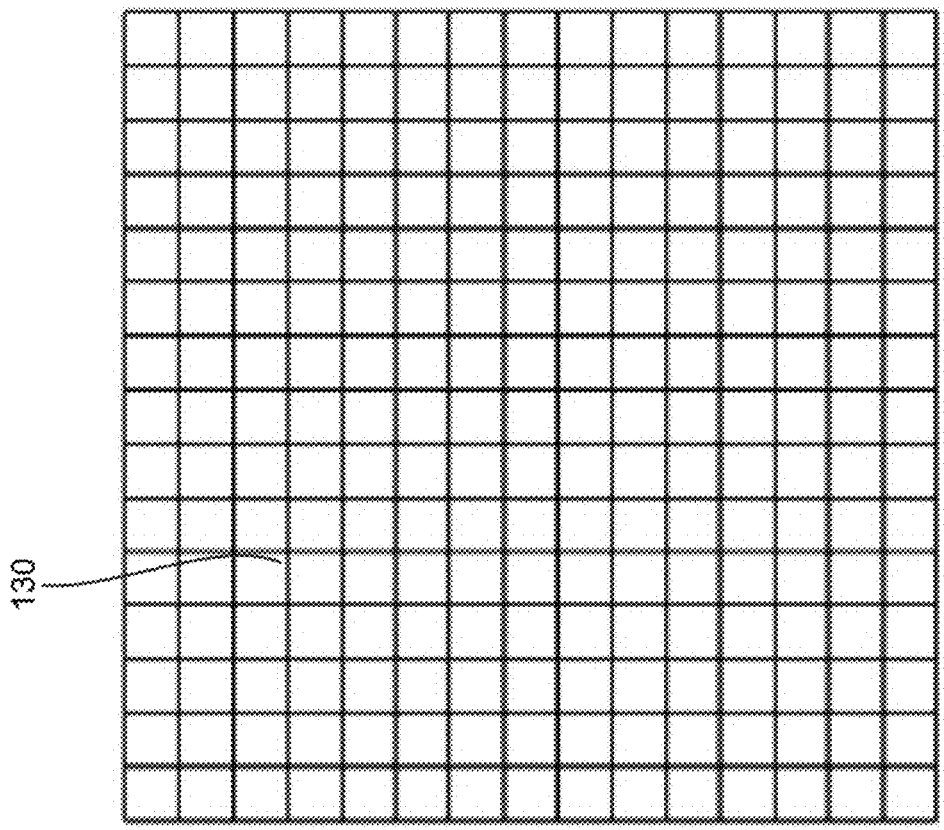
Figure 6C:
FIG. 6C is a schematic depiction of the planar cross-section of an outer surface of a tire.
Figure 6D:
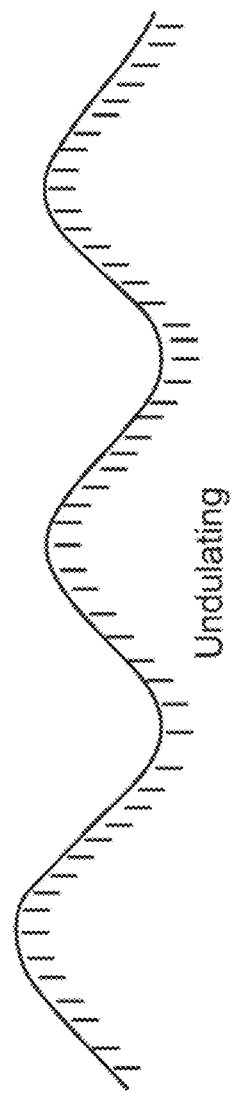
FIG. 6D is a schematic depiction of an undulating surface formed on a tire surface when the mesh backing of the RFID mesh label is integrally incorporated therein.

The mesh backing 130 is a grid having a predetermined shape that includes a plurality of openings distributed throughout the backing such that the inner surface 132 and an outermost surface 134 of the mesh backing are in fluid communication with one another and are configured to pass material (e.g., rubber during vulcanization) from the green article/tire there through in a direction towards the RFID device 120 and/or face layer 110 of the RFID mesh label 100. As shown, for example in FIGS. 6A and 6B, the grid is either an orthogonal grid shape or a distorted grid respectively. Depending on the desired characteristics and dispersion properties of the rubber through the grid during vulcanization, the grid is either deformable or non-deformable— with the grid either deforming (e.g., resulting in distorted grid) during vulcanization or being non-deformable and maintaining its initial shape during and after vulcanization of the tire.

Figure 4C:
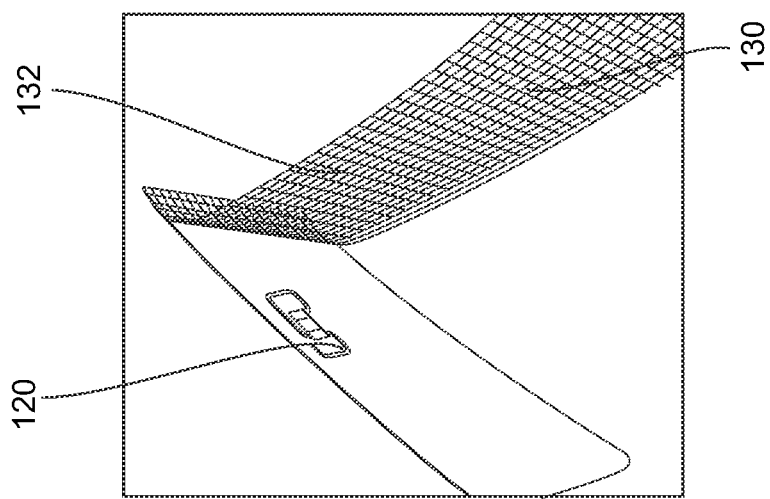
FIG. 4A is a photograph providing a perspective view of the RFID mesh label.
FIG. 4B is a photograph providing aback perspective view of the same mesh label.
FIG. 4(C is a photograph providing a side perspective view of the same mesh label.
Figure 4B:
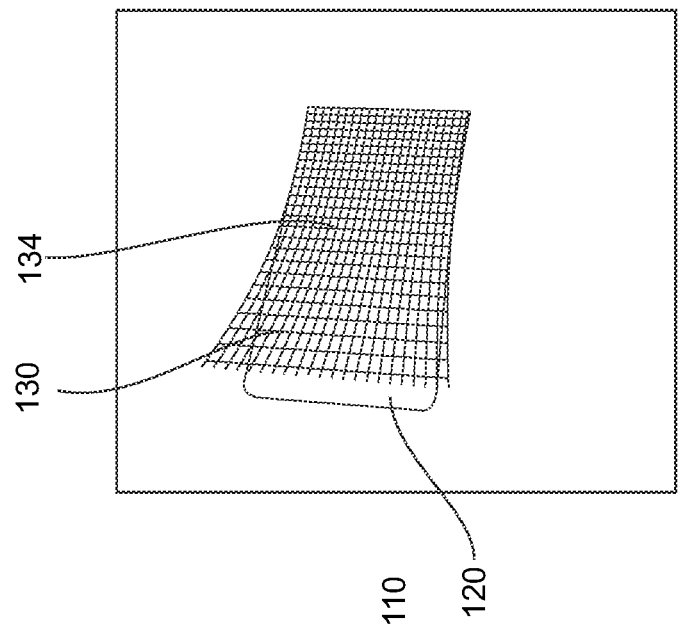
Figure 4A:
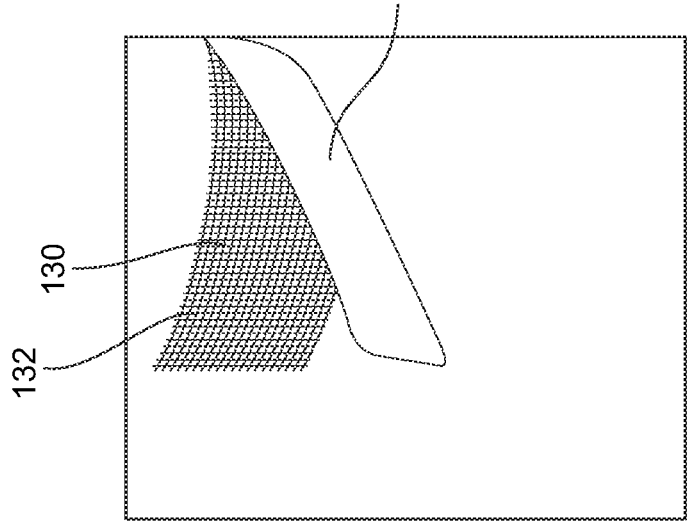
Figure 5C:
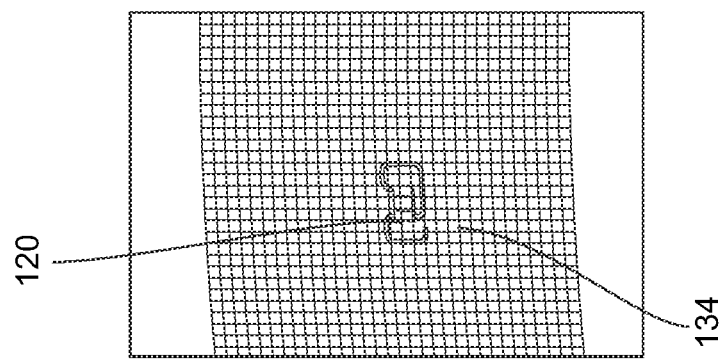
FIG. 5C is another back perspective view of the same mesh label with the RFID layer positioned between the mesh material and face layer.
Figure 5B:
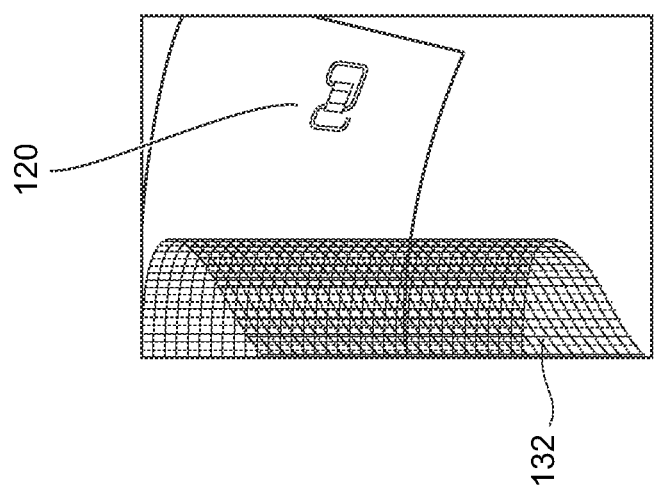
FIG. 5B is a back perspective view of the same mesh label further including the mesh material.
Figure 5A:
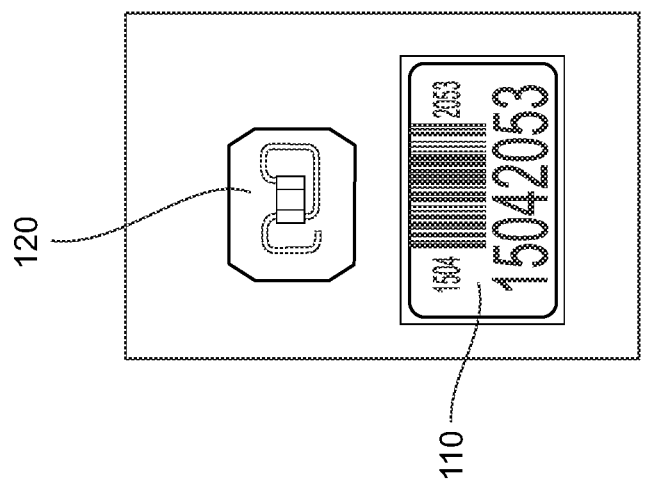
FIG. 5A is a photograph showing the face layer and RFID layer of another RFID mesh label with a bar code printed on the face layer.

In certain aspects and in view of FIGS. 1, 2A-2C, and 6A, the mesh backing 130 is either a deformable or non-deformable orthogonal grid configured to pass and disperse green rubber material from a green tire 200 through the orthogonal grid during vulcanization to the RFID layer 120 and/or the inner surface 114 of face layer 110 such that portions of the RFID layer and/or face layer are bonded to the vulcanized tire upon completion of the vulcanization process. In certain preferred aspects, the mesh backing 130 is a non-deformable orthogonal grid configured to homogeneously pass and disperse green rubber material from a green tire 200 through the non-deformable orthogonal grid during vulcanization to the RFID layer 120 and/or face layer 110 such that portions of the RFID layer and/or face layer are homogeneously bonded to the vulcanized tire. FIGS. 4A-4C and FIGS. 5A-5C show various photographs of the contemplated RFID mesh labels having various construction(s). For example, FIG. 4A is a photograph providing a perspective view of the RFID mesh label 100 depicting the face layer 110 and mesh backing 130 including the inner surface 132 thereof; FIG. 4B is a photograph providing a back perspective view of the same mesh label (of FIG. 4A) further depicting the RFID layer and mesh backing 130 including the outermost surface 134; and FIG. 4C is a photograph providing a side perspective view of the same mesh label having the RFID layer 120 partially separated from the inner surface 132 of the mesh backing 130. FIG. 5A is a photograph showing the face layer 110 and RFID layer 120 of another contemplated RFID mesh label with a bar code printed on the face layer, FIG. 5B is a back perspective view of the same RFID mesh label further including the mesh backing 130 and the RFID layer 120; and FIG. 5C is another back perspective view of the same mesh label fully assembled with the RFID layer 120 positioned between the mesh backing 130 and face layer (not shown).

In view of FIGS. 2A-2D and FIG. 3, the RFID mesh label 100 according to the invention can be installed during tire manufacture such that the label becomes an integral, inseparable part of the tire. In view of FIGS. 2A-2D and FIG. 7, the RFID mesh label 100 can be affixed to and/or incorporated within a wide array of green tires 200 and/or vulcanized tires 300 tire locations thereon including, but not limited to, the sidewall 311, bead 310, etc. As discussed in detail below, the label can be incorporated into the sidewall 311 to facilitate reading from alongside the tire as well as avoid impact damage.

FIGS. 2A-2D sequentially depict the RFID mesh label 100 being provided/attached to a green tire 200 and subsequently migrating/descending towards an internal depth ($D^1$) within inner portion 202 of the tire during vulcanization such that the RFID mesh label 100 is integrally formed/incorporated within the vulcanized tire 300 (formed from vulcanization of the green tire), and FIG. 3 further depicts the sequential steps S1-S5 of integrally incorporating/forming the RFID mesh label(s) 100 disclosed herein within a vulcanized tire 300.

Figure 3:
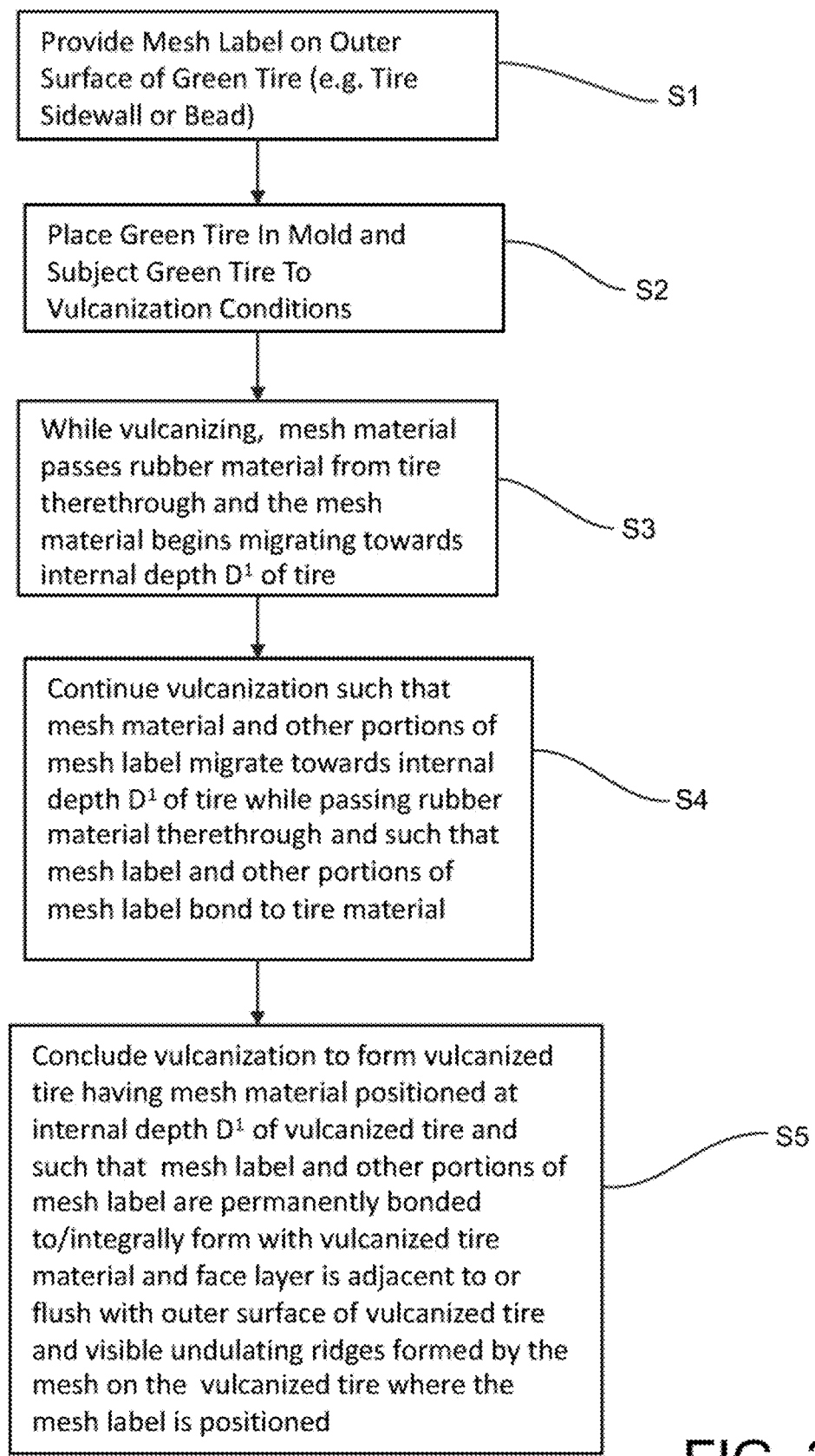
FIG. 3 depicts steps S1-S5 associated with the method of integrally forming the RFID mesh label(s) disclosed herein within a vulcanized tire.

With specific reference to FIG. 2A and step S1 in FIG. 3, the RFID mesh label 100 is initially provided and the outer surface 134 of the mesh backing 130 is adhered/attached to an outermost surface 201 of a green rubber article/green tire 200. The arrows extending downward from the RFID mesh label 100 towards the green tire 200 and arrows extending upward from the green tire 200 indicate the direction(s) in which the RFID mesh label 100 is advanced to adhere/attach the label onto the outermost surface 201 of a green rubber article/green tire 200.

Figure 2B:
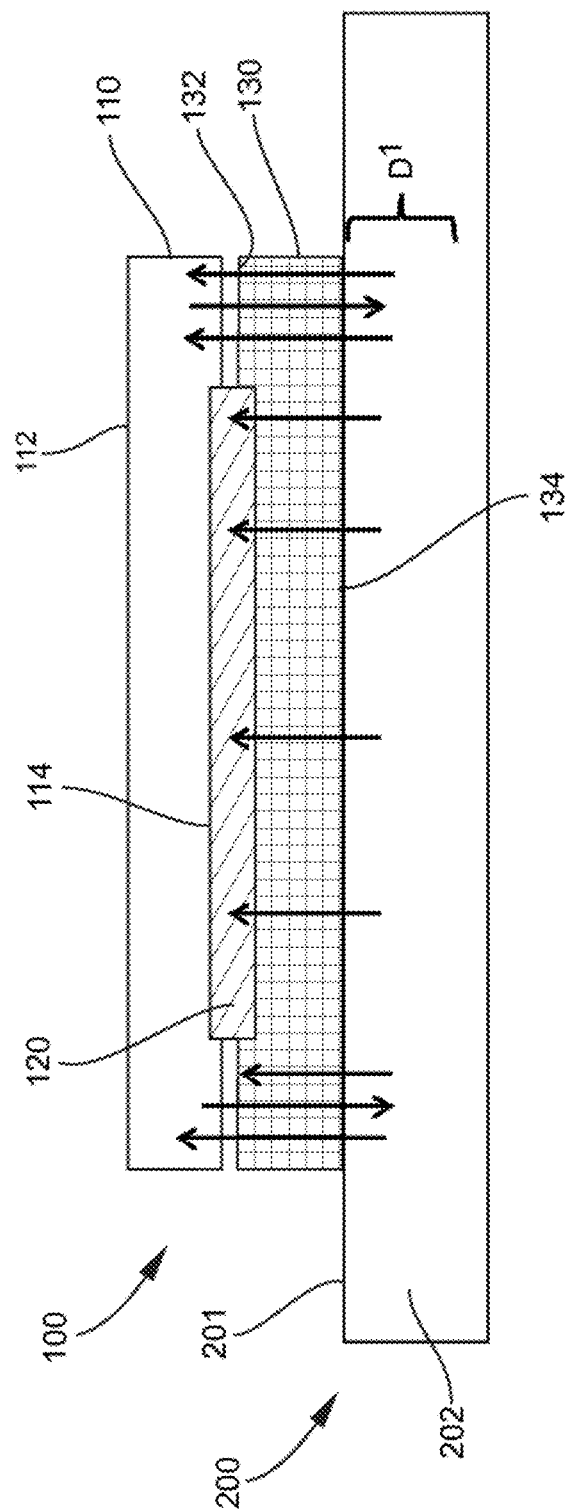

Next and as further detailed in step S2 of FIG. 3 and in view of FIGS. 2A and 2B, the green tire 200 having the RFID mesh label 100 adhered/attached thereto is placed into a tire mold for subsequent vulcanization in which the green tire 200 and RFID mesh label 100 are subjected to temperatures and pressures associated with vulcanization processes to vulcanize the green tire while in the mold.

When initially subjected to temperatures and pressures associated with vulcanization processes while vulcanizing the green tire 200 and as further shown in FIG. 2B in view of FIG. 2A, the convergent ends of the face layer 110 and mesh backing 130 release from one another and the released ends of the mesh backing 130 advance in a direction towards the outermost surface 201 of the green tire 200 thereby allowing for more green rubber material to be passed from the green tire there through during vulcanization and to further increase the overall bonding strength between the RFID mesh label (particularly the mesh backing and portions of the RFID layer and portions of the face layer). As further shown in FIGS. 2A and 2B and in further view of step S3 in FIG. 3, while vulcanizing the green tire 200, the mesh material 130 passes green rubber material from the green tire 200 therethrough (indicated as arrows extending upward in a direction extending from inside/inner portions 202 the green tire 200 towards face layer 110) while the mesh backing 130 concurrently begins migrating/descending towards internal depth $D^1$ of an inner portion 202 the green tire 200 (indicated as arrows extending downward in a direction extending from the face layer 110 towards the inside/inner portion(s) 202 of the green tire 200).

Figure 2C:
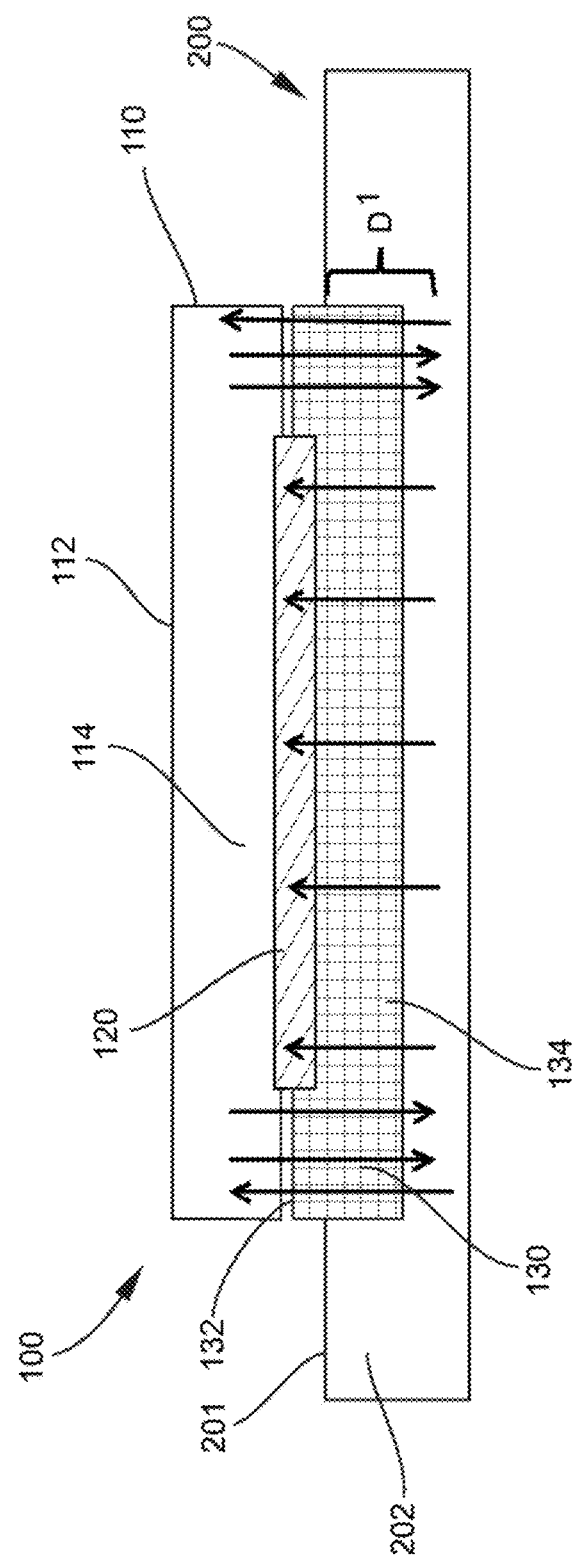
Figure 2D:
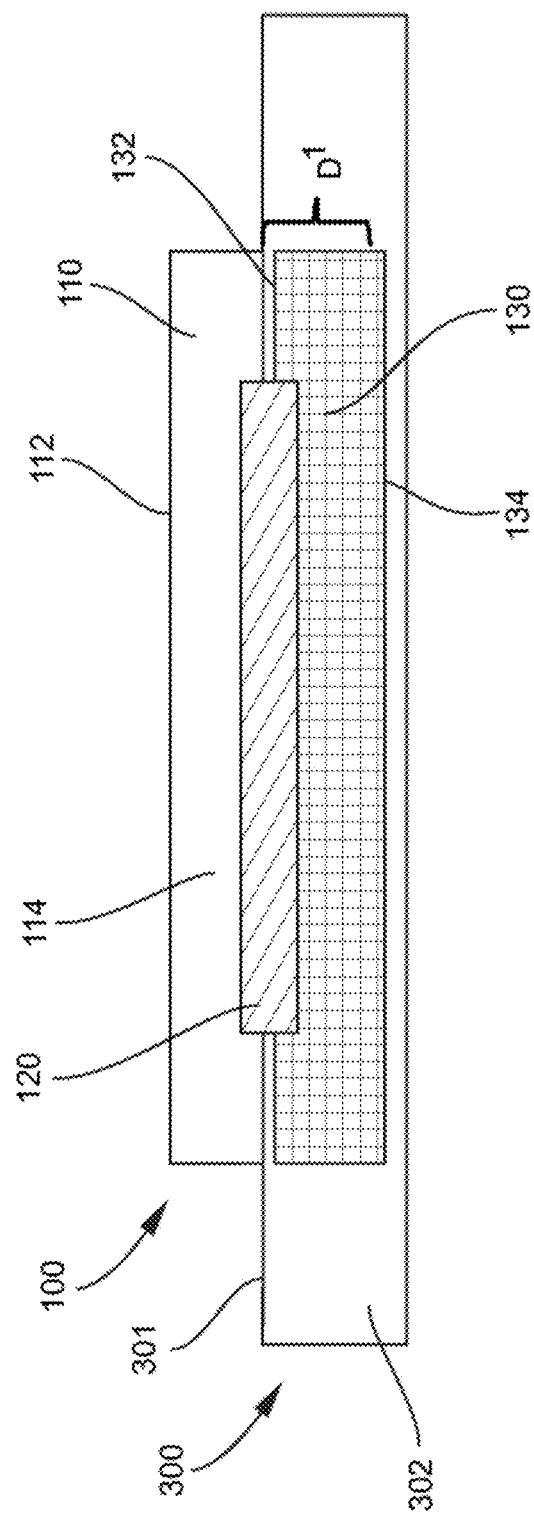
Figure 6E:
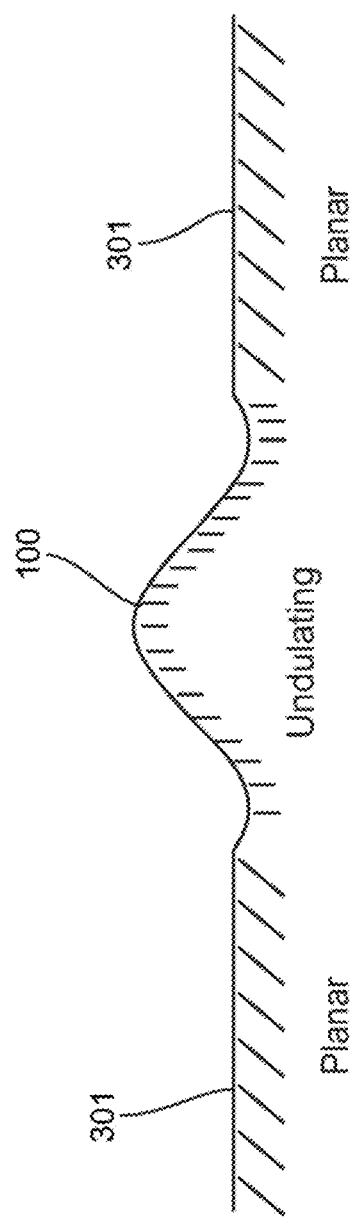
FIG. 6E schematically depicts a cross-section of an outer surface of a vulcanized tire having the RFID mesh label integrally formed therein including an undulating surface and being laterally adjacent to planar surfaces of the tire that do not include the RFID mesh label therein.

In view of steps S4 and S5 of FIG. 3 and FIGS. 2C-2D, vulcanization is continued for a predetermined time period such that mesh backing 130 and other portions of RFID mesh label 100 continue to migrate/descend towards internal depth $D^1$ of tire while passing rubber material therethrough such that the mesh backing 130 and other portions of the mesh label bond to tire material 202 during vulcanization. With specific reference to step S5 of FIG. 3 and in further view of FIG. 2D, vulcanization is subsequently concluded thereby forming the vulcanized tire 300 having the meshing backing 130 positioned at internal depth $D^1$ within an inner portion 302 of the vulcanized tire 300 and such that mesh backing 130 and portions of the RFID layer 120 and/or portions of the face layer 110 such as the inner surface 114 of the RFID mesh label 100 are permanently bonded to/integrally incorporated in the vulcanized tire 300. As further shown in FIGS. 2D, 6E, and 8A-8C, the face layer 110 is adjacent to or flush with the outer surface 301 of vulcanized tire 300 upon concluding the vulcanization process. As further shown in FIG. 6E and FIG. 8C, undulating ridges formed by the mesh backing 130 of the RFID mesh label 100 being integrally incorporated in the vulcanized tire 300 are visible when viewing the vulcanized tire and are further flanked by outer surfaces 301 (e.g., planar surfaces and/or planar outer surfaces) immediately adjacent the RFID mesh label 100 on the vulcanized tire.

As a result of the above discussed vulcanization process(es): (1) the mesh backing at least partially releases from the RFID mesh label as a result of heat and/or pressure during vulcanization; (2) the rubber (from the green article/tire) floats through the mesh backing/material and crosslinks the RFID mesh label to the rubber while the mesh backing/material migrates/descends within the rubber; and (3) upon concluding vulcanization, the mesh backing creates a very stiff area ("non-flexing zone") within the vulcanized rubber article just under the label surface (view as undulating ridges in FIGS. 6E and 8C) that advantageously absorbs and/or dampens mechanical stress transmitted from the vulcanized tire to the RFID mesh label thereby ensuring operability and increasing lifespan of the RFID device/layer included within the RFID mesh label disclosed herein. As a further result of the above discussed process(es)/method(s), the RFID mesh label remains on/in the rubber product (e.g., vulcanized tire) and is inseparable from the rubber for the lifetime of the product.

The disclosed RFID mesh label 100 provides a solution that creates a non-flexing zone within the rubber product (i.e., vulcanized product or vulcanized tire) just under the surface of the label while allowing the rubber to flow through the mesh material and bond the label to the tire. The mesh backing 130 is released during the process of vulcanization and creates this non-flexing zone. Therefore, the solution significantly reduces the amount of stress placed on the label thereby increasing operability and lifespan of the label.

Figure 7:
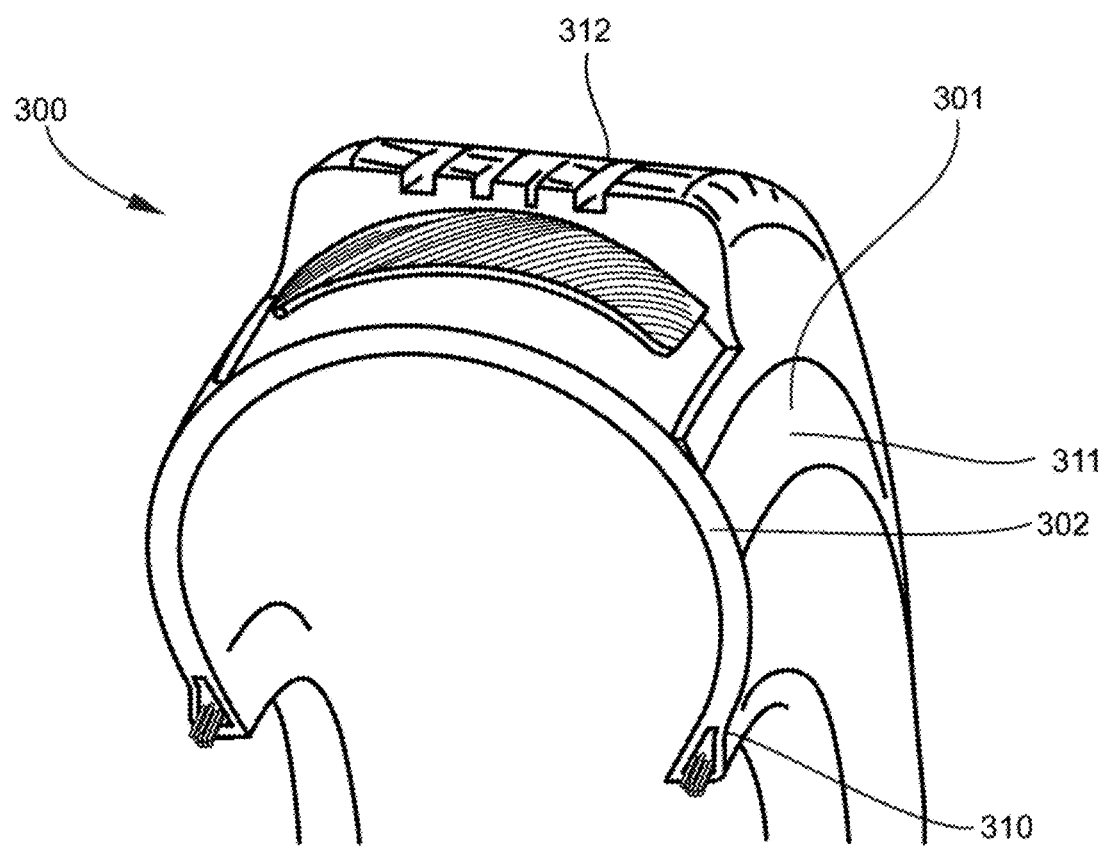
FIG. 7 is a schematic depiction of a vulcanized tire including tread, sidewall(s), and a bead.

As shown in FIGS. 7, 8A, and 8B, the RFID mesh label 100 further allows for placement on different locations other than the bead area 310 in vulcanized tires 300, which include, for example, tire sidewalls 311 and/or tread(s) 312. This placement flexibility is important when the label is combined with an RFID solution, since the label is not required to be placed on the bead area and therefore is not covered by the steel rim.

The inventive concepts disclosed herein are further directed to methods of identifying a rubber-based article. The method can include affixing one or more RFID mesh labels 100 to a rubber-based article, the label including an RFID component configured to provide a unique identifier or other information upon being read or otherwise interrogated. Once the label is affixed to the rubber-based article, the unique identifier is thus associated with that particular article. The label can be affixed to the article prior to vulcanization or in certain applications, after vulcanization.

The article can be identified by use of an RFID reader as previously described herein. Identification of the article enables a wide array of applications to be performed such as tracking the article in a manufacturing or production system, monitoring the location of the article, performing inventory operations, fleet management, maintenance and repair, product life cycle management, etc.

The RFID mesh label is suitable for use with other articles, including other rubber-based and non-rubber-based articles. Non-limiting examples of other rubber-based articles include suspension components, cushions, shoe soles, hoses, hockey pucks, conveyor belts, musical mouth pieces, bowling balls, rubber mats, etc.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An RFID mesh label configured to be integrally incorporated within a vulcanized tire and to provide unique identifier(s) and/or other information about the vulcanized tire, the RFID mesh label comprising:
    a face layer configured to be positioned adjacent or flush to an outer surface of the vulcanized tire;
    an RFID layer positioned underneath the face layer, the RFID layer having an RFID device that is configured to provide unique identifier(s) and/or other information about the vulcanized tire upon being read with an RFID reader; and
    a mesh backing overlying the RFID layer and adapted to be integrally incorporated in a vulcanized tire after subjecting a green tire to a vulcanization process, wherein
    the mesh backing includes reactive groups that facilitate bonding between a green tire and the mesh backing, and
    the face layer and mesh backing have convergent ends bonded together along the periphery of the RFID mesh label such that the face layer and mesh backing surround the RFID layer.

2. The RFID mesh label of claim 1, wherein the mesh backing includes a surface treatment that facilitates bonding between a green tire and the mesh backing.

3. The RFID mesh label of claim 2, wherein the surface treatment comprises a coating having the reactive groups therein, the reactive groups comprising reactive thiols, reactive amines reactive hydroxyls, or any combination thereof that facilitate crosslinking between the mesh backing and a green tire during vulcanization to integrally incorporate the mesh backing within the vulcanized tire.

4. The RFID mesh label of claim 1, wherein the convergent ends of the face layer and mesh backing are configured to release from one another during vulcanization.

5. The RFID mesh label of claim 4, wherein the mesh backing is an orthogonal grid configured to pass and disperse green rubber material from a green tire through the orthogonal grid during vulcanization to the RFID layer and/or face layer such that portions of the RFID layer and/or face layer are bonded to the vulcanized tire.

6. The RFID mesh label of claim 5, wherein the mesh backing is a non-deformable orthogonal grid configured to homogeneously pass and disperse green rubber material from a green tire through the non-deformable orthogonal grid during vulcanization to the RFID layer and/or face layer such that portions of the RFID layer and/or face layer are bonded to the vulcanized tire.

7. The RFID mesh label of claim 6, wherein the mesh backing is more rigid than both the RFID and face layer(s) and is configured to limit mechanical stress to the RFID and/or face layers while in the RFID mesh label is use by absorbing and/or dampening mechanical stress transmitted from the vulcanized tire to the RFID mesh label.

8. The RFID mesh label of claim 1, wherein an outermost surface of the face layer comprises unique identifiers configured to identify the RFID mesh label before, during, and/or after vulcanization.

9. The RFID mesh label of claim 8, wherein the unique identifiers of the face layer comprise a color, 2D bar coding, 3D bar coding, or any combination thereof.

10. The RFID mesh label of claim 8, wherein the unique identifiers of the face layer comprise at least two of a color, 2D bar coding, or 3D bar coding.

11. The RFID mesh label of claim 8, wherein the unique identifiers of the face layer comprise a color, 2D bar coding, and 3D bar coding.

12. The RFID mesh label of claim 8, wherein an adhesive is positioned between the face and mesh layers.

13. The RFID mesh label of claim 8, wherein the face layer is a solid material having no voids and/or openings formed on its outermost surface.

14. The RFID mesh label of claim 1, wherein the face layer is a solid material having no voids and/or openings formed on its outermost surface.

15. A method for forming vulcanized tire(s) having the RFID mesh label of claim 1 integrally incorporated therein, the method comprising:
 (a) attaching an RFID mesh label on outer surface of a green tire;
 (b) placing the green tire with the RFID mesh label attached thereon into a tire mold;
 (c) subjecting the green tire of step (b) to vulcanization conditions;
 (d) while vulcanizing the green tire of step (c), passing green rubber material from the green tire through a mesh backing of the RFID mesh label in a direction towards a face layer of the RFID mesh label while concurrently migrating the RFID mesh label in an internal direction of the green tire; and
 (e) concluding vulcanization thereby forming a vulcanized tire having the mesh backing of the RFID mesh label internally positioned within the vulcanized tire such that:
  (i) the mesh backing and other portions of the RFID mesh label are permanently bonded to internal portions of the vulcanized tire, and
  (ii) the face layer is adjacent to or flush with an outer surface of vulcanized tire such that an RFID device within the RFID mesh label can be read from a predetermined distance by a RFID reader.

16. The method of claim 15, wherein the RFID mesh label comprises the face layer and mesh backing with the RFID device positioned there between.

17. The method of claim 15, wherein the mesh backing is an orthogonal grid shape.

18. The method of claim 17, wherein the mesh backing maintains an orthogonal grid shape throughout vulcanization and after step (e) of forming the vulcanized tire.

19. The method of claim 17, wherein the green rubber material homogeneously disperses through the orthogonal grid during step (d).

20. The method of claim 19, wherein the vulcanized tire of step (e) includes undulating ridges formed on and visible from an outer surface of the vulcanized tire, the undulating ridges correspond to the mesh backing permanently bonded within the vulcanized tire.

21. The method of claim 20, wherein the face layer further comprises bar coding formed thereon.

22. The method of claim 15, wherein the RFID mesh label is integrally incorporated on a tire sidewall or a tire bead.

23. The method of claim 15, wherein an outermost surface of the face layer of the RFID mesh label comprises unique identifiers to identify the RFID mesh label.

24. The method of claim 23, wherein the unique identifiers of the face layer comprise a color, 2D bar coding, 3D bar coding, or any combination thereof.

25. The RFID mesh label of claim 23, wherein the unique identifiers of the face layer comprise at least two of a color, 2D bar coding, or 3D bar coding.

26. The method of claim 23, wherein the unique identifiers of the face layer comprise a color, 2D bar coding, and 3D bar coding.

27. The method of claim 23, wherein an adhesive is positioned between the face and mesh layers.

28. The method of claim 23, wherein the face layer is a solid material having no voids and/or openings formed on its outermost surface.

29. The method of claim 15, wherein the face layer is a solid material having no voids and/or openings formed on its outermost surface.

30. A vulcanized tire comprising:
 an RFID mesh label integrally incorporated within the vulcanized tire that is configured to provide unique identifier(s) and/or other information about the tire, wherein the RFID mesh label comprises:
 a face layer configured to be adjacent or flush to an outer surface of the vulcanized tire, the outer surface of the vulcanized tire is a tire sidewall or a tire bead;
 an RFID layer positioned underneath the face layer, the RFID layer having an RFID device that provides unique identifier(s) and/or other information upon being read with an RFID reader; and
 a mesh backing overlying the RFID layer that is a non-deformable orthogonal grid having vulcanized rubber material homogeneously passed and dispersed there through such that the mesh backing is surrounded by and bonded to vulcanized rubber material of the vulcanized tire and portions of the RFID layer and face layer of the RFID mesh label are bonded to vulcanized rubber material of the vulcanized tire, wherein
 the mesh backing includes a surface treatment having reactive groups that facilitate bonding between a green tire and the mesh backing, and
 the face layer and mesh backing have convergent ends bonded together along the periphery of the RFID mesh label such that the face layer and mesh backing surround the RFID layer.

31. The vulcanized tire of claim 30, wherein the RFID mesh label further comprises bar coding formed on an outermost surface of the face layer.

32. The vulcanized tire of claim 31, wherein undulating ridges are formed on an outer surface of the vulcanized tire that correspond to the internal position of the mesh backing positioned within the vulcanized tire and the undulating ridges are laterally adjacent to planar surfaces formed on the outer surface of the vulcanized tire.

33. The vulcanized tire of claim 30, wherein an outermost surface of the face layer of the RFID mesh label comprises unique identifiers to identify the RFID mesh label before, during, and/or after vulcanization.

34. The vulcanized tire of claim 33, wherein the unique identifiers of the face layer comprise a color, 2D bar coding, 3D bar coding, or any combination thereof.

35. The vulcanized tire of claim 33, wherein the unique identifiers of the face layer comprise at least two of a color, 2D bar coding, or 3D bar coding.

36. The vulcanized tire of claim 33, wherein the unique identifiers of the face layer comprise a color, 2D bar coding, and 3D bar coding.

37. The vulcanized tire of claim 33, wherein an adhesive is positioned between the face and mesh layers.

38. The vulcanized tire of claim 33, wherein the face layer is a solid material having no voids and/or openings formed on its outermost surface.

39. The vulcanized tire of claim 30, wherein the face layer is a solid material having no voids and/or openings formed on its outermost surface.

\* \* \* \* \*